(12) United States Patent
Amano et al.

(10) Patent No.: US 11,061,307 B2
(45) Date of Patent: Jul. 13, 2021

(54) PROJECTION OPTICAL SYSTEM AND PROJECTOR

(71) Applicant: FUJIFILM Corporation, Tokyo (JP)

(72) Inventors: Masaru Amano, Saitama (JP); Yukiko Nagatoshi, Saitama (JP); Hironobu Kayano, Saitama (JP); Kenji Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/886,960

(22) Filed: May 29, 2020

(65) Prior Publication Data

US 2020/0292922 A1 Sep. 17, 2020

Related U.S. Application Data

(63) Continuation of application No. PCT/JP2018/043923, filed on Nov. 29, 2018.

(30) Foreign Application Priority Data

Nov. 30, 2017 (JP) .............................. JP2017-230956

(51) Int. Cl.
*G03B 21/14* (2006.01)
*G03B 21/16* (2006.01)
(Continued)

(52) U.S. Cl.
CPC ............ *G03B 21/142* (2013.01); *G03B 21/28* (2013.01)

(58) Field of Classification Search
CPC ........ G03B 21/00; G03B 21/14; G03B 21/02; G03B 21/142; G02B 27/02
(Continued)

(56) References Cited

U.S. PATENT DOCUMENTS 10,168,609 B2 * 1/2019 Kuroda ................. G02B 7/02
10,197,894 B2 * 2/2019 Yamada ............... G03B 21/145
(Continued)

FOREIGN PATENT DOCUMENTS

JP    9-197341 A    7/1997
JP    2002-162688 A    6/2002
(Continued)

OTHER PUBLICATIONS

Japanese Notice of Reasons for Refusal for corresponding Japanese Application No. 2019-557315, dated Dec. 15, 2020, with an English translation.
(Continued)

*Primary Examiner* — William C. Dowling
(74) *Attorney, Agent, or Firm* — Birch, Stewart, Kolasch & Birch, LLP.

(57) ABSTRACT

A first optical system, a first mirror, a second optical system, a second mirror, and a third optical system are disposed in order on an optical axis from an image forming panel to a screen. A first optical axis of the first optical system, a second optical axis of the second optical system, and a third optical axis of the third optical system are formed in a U shape, and orientations of luminous fluxes of the first optical axis and the third optical axis are reversed. The first mirror, the second optical system, the second mirror, and the third optical system are held to make a second holding barrel with respect to the first optical system. The second holding barrel is rotationally moved in a rotational movement range of 45° with respect to a first holding barrel. In projecting portrait image instead of a landscape image, the second holding barrel is rotated in increments of 45° with respect to the first holding barrel.

17 Claims, 11 Drawing Sheets

(51) Int. Cl.
*H04N 9/31* (2006.01)
*G03B 21/28* (2006.01)

(58) Field of Classification Search
USPC .................................................... 353/98, 99
See application file for complete search history.

(56) References Cited

U.S. PATENT DOCUMENTS

| | | | |
|---|---|---|---|
| 10,642,135 B2 * | 5/2020 | Kuroda | G02B 7/022 |
| 10,928,720 B2 * | 2/2021 | Uchida | G02B 13/16 |
| 10,942,437 B2 * | 3/2021 | Kayano | H04N 9/3194 |
| 2004/0257539 A1 | 12/2004 | Peterson et al. | |
| 2005/0088762 A1 | 4/2005 | Ohashi | |
| 2012/0147481 A1 | 6/2012 | Hsueh | |
| 2016/0246037 A1 | 8/2016 | Amano | |
| 2018/0217489 A1 * | 8/2018 | Kuroda | G02B 13/16 |
| 2019/0086783 A1 * | 3/2019 | Kuroda | G03B 21/00 |
| 2019/0101816 A1 * | 4/2019 | Kuroda | G02B 27/0955 |
| 2019/0155128 A1 * | 5/2019 | Shimizu | G03B 11/00 |
| 2019/0219802 A1 * | 7/2019 | Kuroda | G02B 17/023 |
| 2019/0219915 A1 * | 7/2019 | Kayano | G02B 7/023 |
| 2020/0019051 A1 * | 1/2020 | Uchida | G02B 13/18 |
| 2020/0292923 A1 * | 9/2020 | Amano | G02B 27/0955 |
| 2020/0292924 A1 * | 9/2020 | Amano | G03B 21/30 |
| 2020/0301267 A1 * | 9/2020 | Kuroda | G03B 21/28 |

FOREIGN PATENT DOCUMENTS

| | | |
|---|---|---|
| JP | 2005-128286 A | 5/2005 |
| JP | 2007-525700 A | 9/2007 |
| JP | 2012-98506 A | 5/2012 |
| JP | 2012-242487 A | 12/2012 |
| JP | 2014-153474 A | 8/2014 |
| JP | 2014-170097 A1 | 9/2014 |
| JP | 2016-156986 A | 9/2016 |
| JP | 2016-191755 A | 11/2016 |
| JP | 2017-142281 A | 8/2017 |
| WO | WO 2017/056925 A1 | 4/2017 |
| WO | WO 2017/169903 A1 | 10/2017 |

OTHER PUBLICATIONS

International Preliminary Report on Patentability and English tralstatton of the Written Opinion of the International Searching Authority (PCT/IB/326, PCT/IB/373 and PCT/ISA/237) dated Jun. 11, 2020 for Application No. PCT/JP2018/043923.
International Search Report (PCT/ISA/210) dated Feb. 12, 2019 for Application No. PCT/JP2018/043923 with an English translation.

* cited by examiner

PROJECTION OPTICAL SYSTEM AND PROJECTOR

CROSS-REFERENCE TO RELATED APPLICATIONS

This application is a Continuation of PCT International Application No. PCT/JP2018/043923 filed on 29 Nov. 2018, which claims priority under 35 U.S.C § 119(a) to Japanese Patent Application No. 2017-230956 filed on 30 Nov. 2017. The above application is hereby expressly incorporated by reference, in its entirety, into the present application.

BACKGROUND OF THE INVENTION

1. Field of the Invention

The present invention relates to a projection optical system and a projector.

2. Description of the Related Art

In recent years, a projector in which a light valve, such as a liquid crystal display element or a digital micromirror device (DMD: Registered Trademark), is mounted has become widespread, and has been improved in performance. In particular, there is demand for increasing resolution performance of a projection optical system along with improvement of the resolution of the light valve.

There is also demand for mounting a highly versatile projection optical system having a compact configuration, higher performance, and a wider angle in a projector in consideration of installability in an indoor space.

In order to meet such demands, a projection optical system that forms an intermediate image with a first optical system consisting of a plurality of lenses and re-forms an image with a second optical system also consisting of a plurality of lenses has been suggested (see JP2016-156986A (corresponding to U.S. 2016/0246037A1)). In a projection optical system consisting of only a normal optical system that does not form an intermediate image, in a case where a focal length is shortened to achieve a wide angle, a lens on a magnification side becomes inevitably excessively large. The projection optical system that forms the intermediate image can shorten a back focus of the second optical system, can decrease a diameter of a lens on the magnification side of the second optical system, and is suitable for shortening a focal length to achieve a wide angle.

Incidentally, in general, since a digital camera has a horizontally long imaging element surface, an image to be obtained through normal imaging becomes a horizontally long landscape image. Furthermore, in a case where imaging is performed in a state in which the camera is rotated by 90° due to composition, an image to be obtained becomes a vertically long portrait image. Accordingly, captured images are recorded in a recording medium, such as a memory card, in a state in which landscape images and portrait images are mixed. In a case where such a recording medium is loaded on, for example, the projector of JP2016-156986A, and an image is projected, in a state in which a landscape image is projected onto a screen in the same orientation as an original image, a portrait image is also projected as a landscape image rotated by 90°. For this reason, a projector that rotates a projection direction by 90° within a horizontal plane using a reflection mirror and displays a portrait image as a landscape image has also been suggested (see JP2014-170097A).

SUMMARY OF THE INVENTION

However, in JP2014-170097A, in a case where the reflection mirror is rotated by 90° within the horizontal plane, the projection direction is also rotated by 90°. For this reason, there is a problem in that it is necessary to rotate the projector itself by 90° to return the projection direction to an opposite side to a rotation direction of the reflection mirror, and an operation becomes complicated.

In a case where an original image of a portrait image is projected on the screen, and in a case where an orientation of an image that is displayed on an image forming panel of the projector is rotated by 90° to match an orientation of a landscape image, it is necessary to display a vertically long image in a vertical direction on a horizontally long rectangular image display surface. Accordingly, the image that is displayed on the image forming panel is displayed on a reduced scale as much, causing a new problem that a projection size changes between the landscape image and the portrait image.

The invention has been accomplished in view of the above-described circumstances, and an object of the invention is to provide a projection optical system and a projector capable of, in a case where an original image in which a landscape image and a portrait image are mixed is projected, projecting both of the landscape image and the portrait image onto a screen in such a manner that a size of an image to be projected is the same.

In order to attain the above-described object, the invention provides a projection optical system comprising a first optical system, a first reflection member, a second reflection member, a third optical system, and a first connection member. The first optical system has a first optical axis. The second reflection member bends the first optical axis to form a second optical axis. The second reflection member bends the second optical axis in the same direction as the first optical axis to form a third optical axis, and makes the third optical axis and the first optical axis parallel to each other. The third optical system has the third optical axis. The first connection member holds the first reflection member, the second reflection member, and the third optical system, and connects the first reflection member, the second reflection member, and the third optical system to the first optical system to be rotationally movable in a rotational movement range with increments of 45° around the first optical axis.

It is preferable that each of the first reflection member and the second reflection member is a member that bends the optical axis at 90°. It is preferable that a reflection surface of each of the first reflection member and the second reflection member is a plane. It is preferable that the projection optical system further comprises a second optical system having the second optical axis between the first reflection member and the second reflection member. It is preferable that the projection optical system further comprises a second connection member that connects the third optical system and the second reflection member to the second optical system to be rotationally movable in increments of 90° around the second optical axis.

The invention also provides a projector comprising the projection optical system, and an image forming panel that displays an image toward the first optical system of the projection optical system based on an original image. It is preferable that the projector further comprises a rotational movement unit that switches a rotational movement position of the first connection member based on image orientation information of the original image. It is preferable that the rotational movement unit sets the second optical axis to a vertical direction in a case where the original image is a horizontally long landscape image based on the image orientation information of the original image, and inclines and sets the second optical axis at 45° with respect to the vertical direction in a case where the original image is a vertically long portrait image. It is preferable that the rotational movement unit has a motor that rotates the second optical axis at 45° around the first optical axis with respect to the first optical system.

According to the invention, it is possible to project a landscape image and a portrait image onto a screen with a simple operation in such a manner that a size of an image to be projected is the same in a projector that is made compact without causing an increase in size.

DESCRIPTION OF THE PREFERRED EMBODIMENTS

First Embodiment

Figure 1:
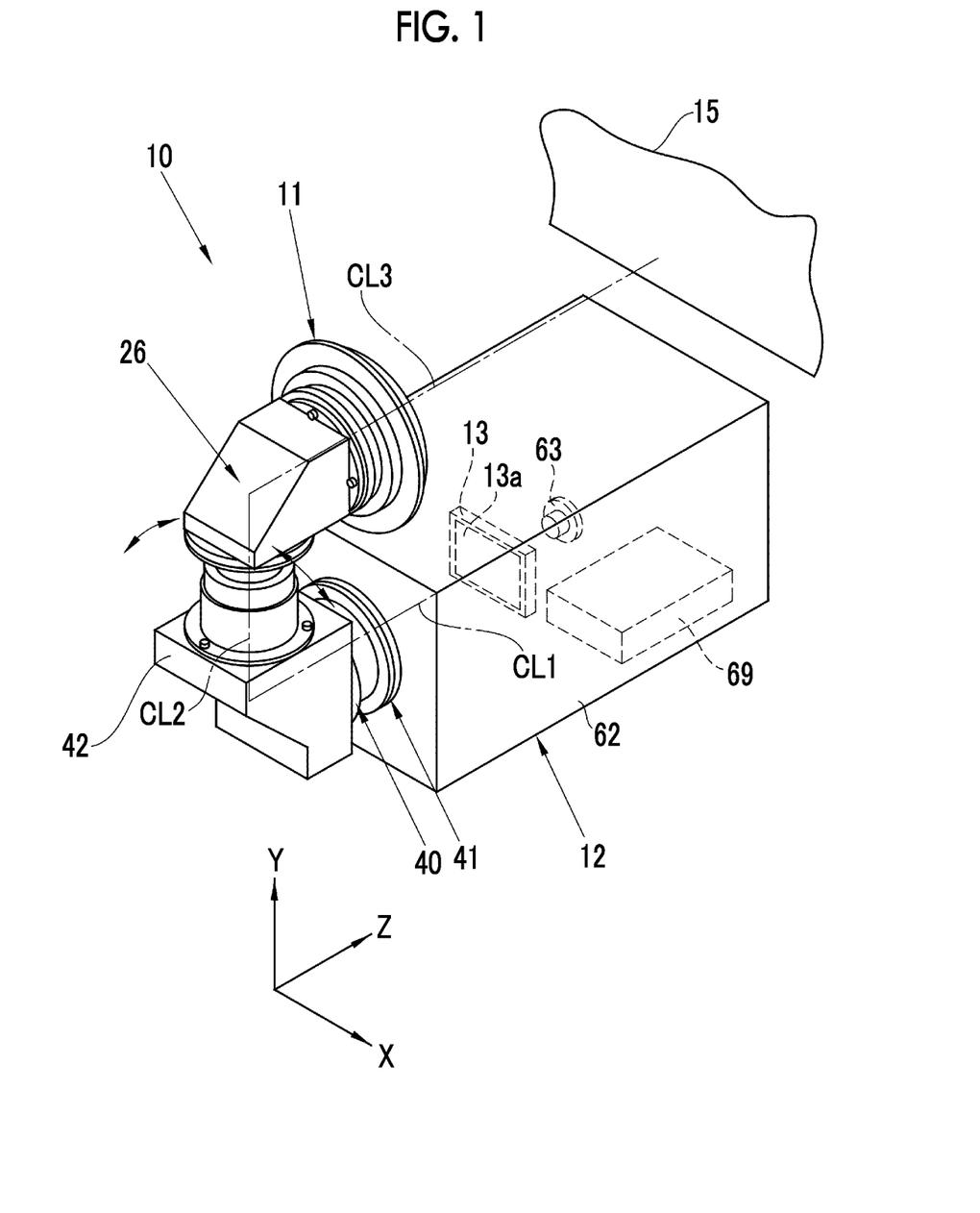
FIG. 1 is a perspective view showing a projector of the invention.

As shown in FIG. 1, a projector 10 of the embodiment comprises a projection optical system 11 and a projector body 12. The projector body 12 has an image forming panel 13. An image is displayed on an image display surface 13a of the image forming panel 13 based on an original image. The projection optical system 11 projects the image displayed on the image forming panel 13 onto a screen 15 as a magnified image.

Figure 2:
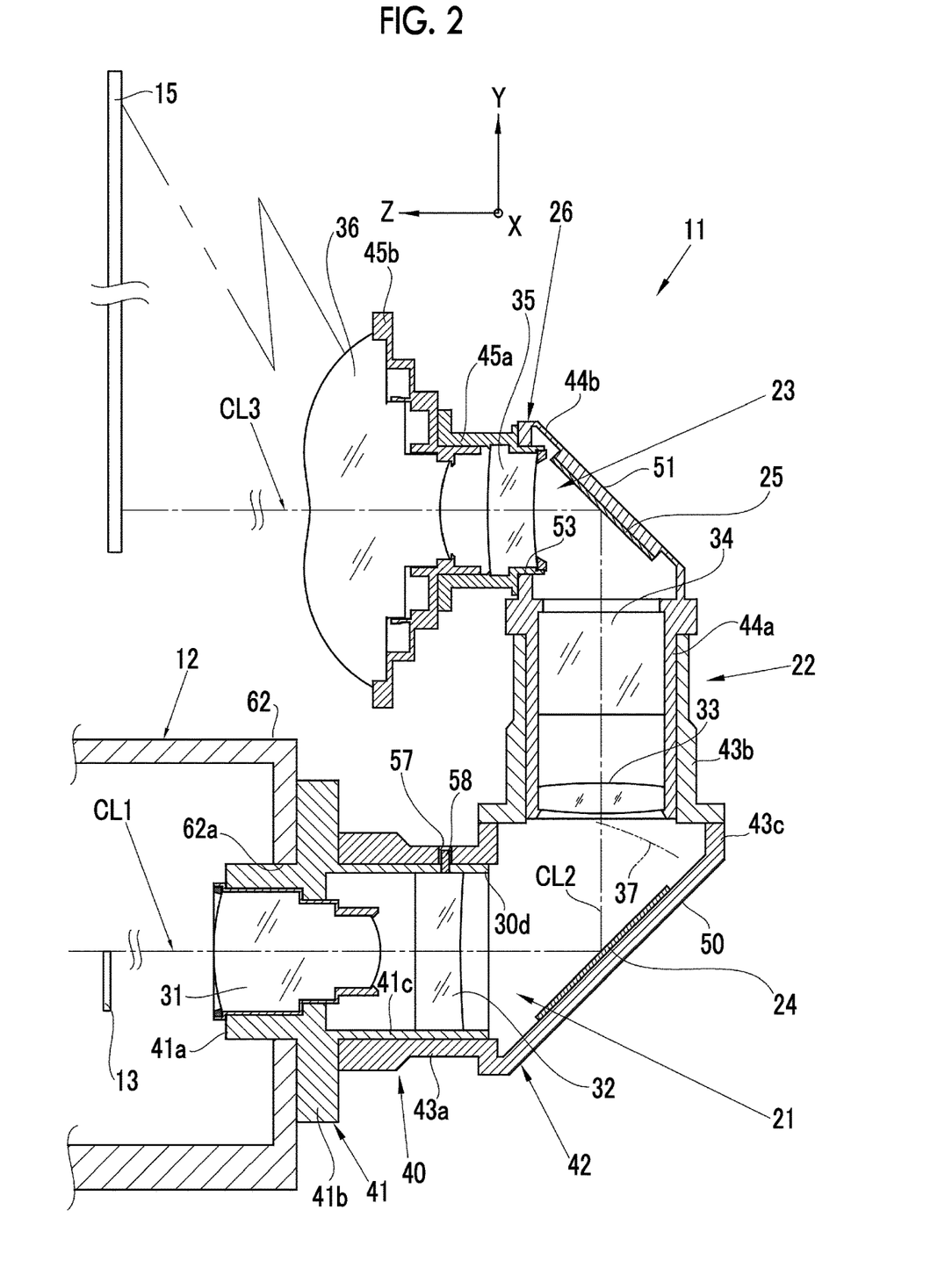
FIG. 2 is a longitudinal sectional view of the projector.

As shown in FIG. 2, the projection optical system 11 comprises, in order on an optical axis from the image forming panel 13 to the screen 15, a first optical system 21 having a first optical axis CL1, a second optical system 22 having a second optical axis CL2, and a third optical system 23 having a third optical axis CL3. In the embodiment, an up-down direction (Y-axis direction), a right-left direction (X-axis direction), and a front-rear direction (Z-axis direction) are determined based on a state in which the projector body 12 turns a projection direction in a direction of the third optical axis CL3.

A first mirror 24 as a first reflection member is disposed between the first optical system 21 and the second optical system 22. The first mirror 24 has a reflection surface that is a plane, and bends the first optical axis CL1 of the first optical system 21 through reflection to form the second optical axis CL2 that intersects the first optical axis CL1 at 90°. A second mirror 25 as a second reflection member is disposed between the second optical system 22 and the third optical system 23. The second mirror 25 has a reflection surface that is a plane, and bends the second optical axis CL2 through reflection to form the third optical axis CL3 that intersects the second optical axis CL2 at 90°. The optical axes CL1 to CL3 are bent in a U shape by the first mirror 24 and the second mirror 25.

The first optical system 21 has a first lens 31 and a second lens 32 in order on the first optical axis CL1 from the image forming panel 13 to the screen 15. The second optical system 22 has a third lens 33 and a fourth lens 34 on the second optical axis CL2. The third optical system 23 has a fifth lens 35 and a sixth lens 36 on the third optical axis CL3. Although each of the first lens 31, the second lens 32, the fourth lens 34, the fifth lens 35, and the sixth lens 36 is shown as a single lens for simplification of illustration, each lens actually consists of a plurality of lens groups. The first lens 31 and the second lens 32 image illumination light from the image forming panel 13 on the imaging plane 37 as an intermediate image. The third lens 33, the fourth lens 34, the fifth lens 35, and the sixth lens 36 project the image of the imaging plane 37 onto the screen 15 on a magnified scale.

The first optical system 21, the second optical system 22, the third optical system 23, the first mirror 24, and the second mirror 25 are stored in a lens barrel 26. The lens barrel 26 has a first holding barrel 41, a second holding barrel 42, and a connection member 40, and the members 40 to 42 are integrally assembled.

The first holding barrel 41 is formed in a stepped cylindrical shape, and has a first lens frame 41a, a flange 41b, and a second lens frame 41c. The first lens 31 is fixed to the first lens frame 41a. The flange 41b is fixed to a lens mounting hole 62a of a housing 62. The second lens 32 is fixed to the second lens frame 41c.

The second holding barrel 42 has a first mirror frame 43c having connection barrels 43a and 43b, a second mirror frame 44b having a connection barrel 44a, a third lens frame 45a, and a fourth lens frame 45b. The first mirror frame 43c is formed in an angular tubular shape having an inclined surface 50, and has the connection barrel 43a in a side portion. The first mirror 24 is fixed to the inner surface of the inclined surface 50. The connection barrel 43a is externally fitted to the second lens frame 41c of the first holding barrel 41, and both of the connection barrel 43a and the second lens frame 41c are rotationally movably connected. The connection member 40 is constituted by the fitting structure of the connection barrel 43a and the second lens frame 41c.

The second mirror frame 44b is formed in an angular tubular shape having an inclined surface 51, and has the connection barrel 44a in a lower portion. The connection barrel 43b is externally fitted to the connection barrel 44a, and both barrels 43b and 44a are rotationally unmovably fixed. The second mirror 25 is fixed to the inner surface of the inclined surface 51. An opening 53 is formed in a left side surface of the second mirror frame 44b. The third lens frame 45a is fixed to the opening 53.

The third lens frame 45a is formed in a cylindrical shape, and the fifth lens 35 is fixed to the third lens frame 45a. The fourth lens frame 45b is formed in a stepped cylindrical shape, and the sixth lens 36 is fixed to the fourth lens frame 45b.

The connection member 40 connects the second holding barrel 42 to the first holding barrel 41 to be rotationally movable in a rotational movement range of 90° around the first optical axis CL1 of the first optical system 21. For this reason, a circumferential groove 57 is formed in the connection barrel 43a of the connection member 40 in an outer circumferential direction. The second lens frame 41c is provided with a rotational movement regulation pin 58 that protrudes therefrom and is engaged with the circumferential groove 57. The circumferential groove 57 is formed to have a length of ¼ of the entire circumference of the connection barrel 43a, and the rotational movement regulation pin 58 moves in the length range. With this, the rotational movement range of the second holding barrel 42 in the connection member 40 is regulated in a range of 90°.

A click mechanism that regulates the rotational movement of the connection member 40 is provided at each of one end position, a center position, and the other end position of the rotational movement range. The click mechanism is constituted of a known click mechanism having storage portions and protrudable protrusions that are locked to the storage portions. The click mechanism is configured such that one protrusion is locked to another storage portion each time the connection member 40 is set at the one end position, the center position, and the other end position. With this, the rotational movement at the one end position, the center position, and the other end position in the rotational movement range is regulated. Then, the second holding barrel 42 is rotationally moved with force beyond the rotational movement regulation, whereby the click mechanism is unlocked and the second holding barrel 42 can be rotationally moved in the rotational movement range of 90° around the first optical axis CL1.

Figure 3:
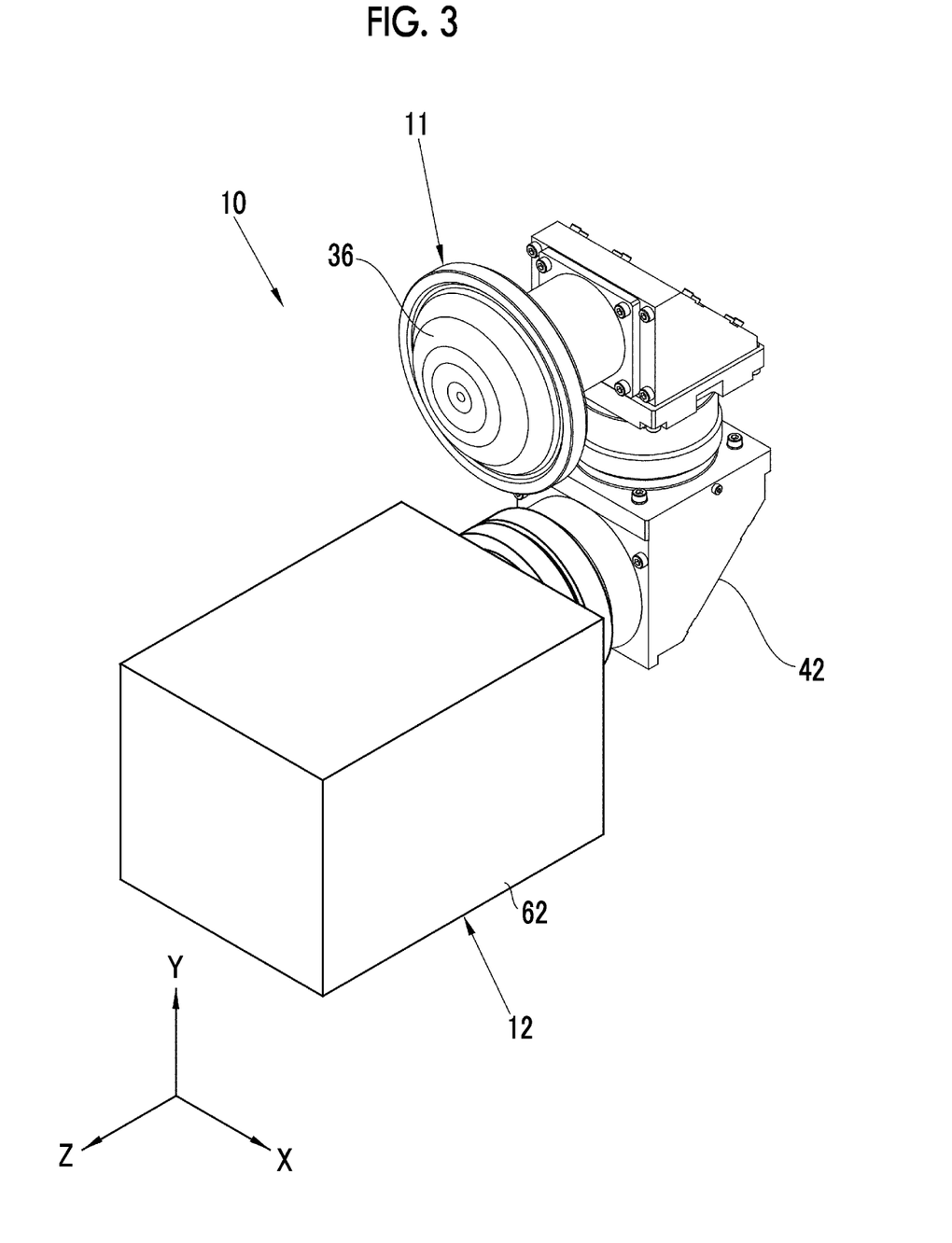
FIG. 3 is a perspective view showing the projector in a projection state of a landscape original image.
Figure 4:
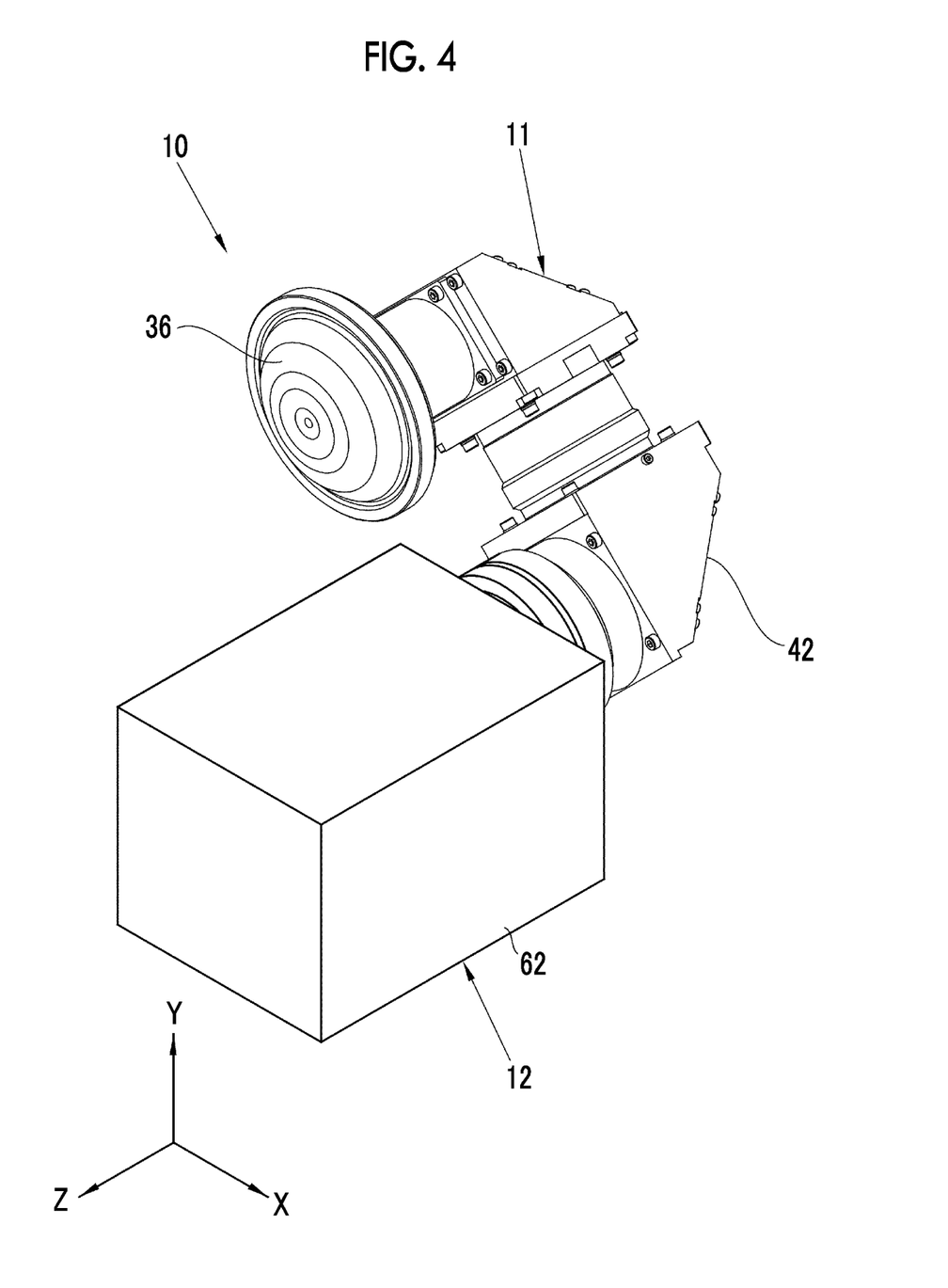
FIG. 4 is a perspective view showing the projector in a projection state of a portrait original image.
Figure 5:
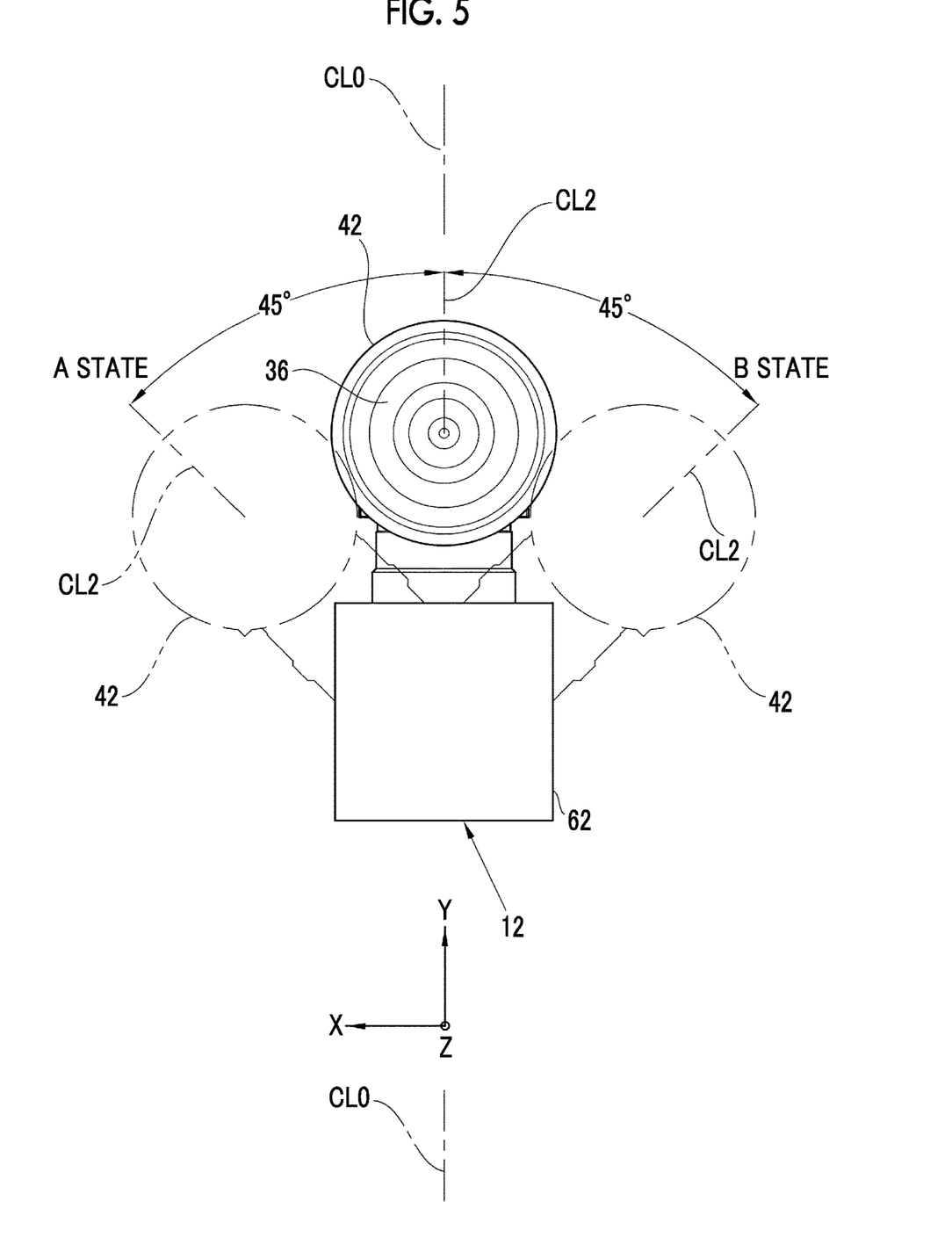
FIG. 5 is a front view showing a rotational movement state of a second holding barrel.

FIG. 3 shows a state in which the second holding barrel 42 is fixed to the first holding barrel 41 (see FIG. 2) at a center position in a circumferential direction of the rotational movement range by the click mechanism. The second holding barrel 42 is positioned in a vertical direction at the center position. FIG. 4 shows a state in which the second holding barrel 42 is fixed to the first holding barrel 41 at one end portion in the circumferential direction of the rotational movement range by the click mechanism. As shown in FIG. 5, the second optical axis CL2 of the second holding barrel 42 is positioned to be inclined at 45° with respect to a vertical line CL0 at the one end position. FIG. 5 shows a state of the projector 10 when viewed from a front surface. The projection optical system 11 that is locked at the center position in the circumferential rotational movement range is indicated by a solid line, and the projection optical system 11 that is locked at the one end position or the other end position is indicated by a two-dot-chain line.

The lens configuration of the first lens 31 to the sixth lens 36 is described in detail, for example, in "Projection Optical System and Projection Display Device" of JP2016-156986A, JP2016-156983A, or the like. The optical systems described in the documents can be used as the projection optical system 11. With the projection optical systems and the projection display devices, an optical system having high projection performance of which aberrations are satisfactorily corrected at a wide angle is obtained.

As shown in FIG. 1, the projector body 12 has a light source 63, an image forming panel 13, and a controller 69 stored in the housing 62 substantially having a rectangular parallelepiped shape. The projector body 12 has a square longitudinal section and is formed in a rectangular parallelepiped shape to have a size in which the corners of the projector body 12 are positioned inside the rotational movement range of the second holding barrel 42 around the first optical axis CL1. Accordingly, even though the second holding barrel 42 is rotationally moved, the second holding barrel 42 does not come into contact with the projector body 12.

As the image forming panel 13, for example, a transmissive liquid crystal panel is used. The light source 63 is disposed on a rear surface of the image forming panel 13, that is, on an opposite side of the image forming panel 13 from the projection optical system 11. The light source 63 uses a light emitting diode (LED) that emits light of three colors of red (R), green (G), and blue (B) simultaneously, and illuminates the image forming panel 13. Instead of an LED, a xenon lamp, a halogen lamp, an ultra-high pressure mercury lamp, or the like that emits white light may be used. The projection optical system 11 projects illumination light from the image forming panel 13 illuminated by the light source 63 onto the screen 15.

Figure 6:
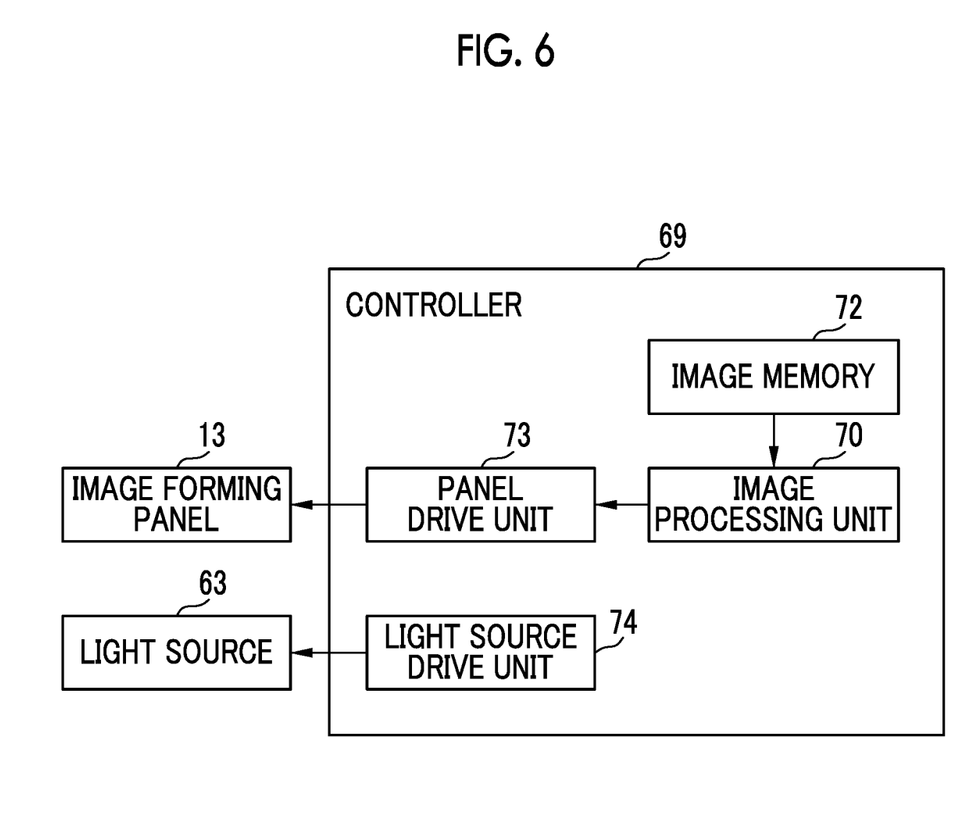
FIG. 6 is a control block diagram.

As shown in FIG. 6, the controller 69 has an image processing unit 70, an image memory 72, a panel drive unit 73, and a light source drive unit 74. The image processing unit 70 executes image processing on an original image from the image memory 72 and sends an image signal to the panel drive unit 73. The panel drive unit 73 drives the image forming panel 13 based on the image signal to display an image of three colors of RGB on the image display surface 13a. The light source drive unit 74 turns on the light source 63.

Figure 7:
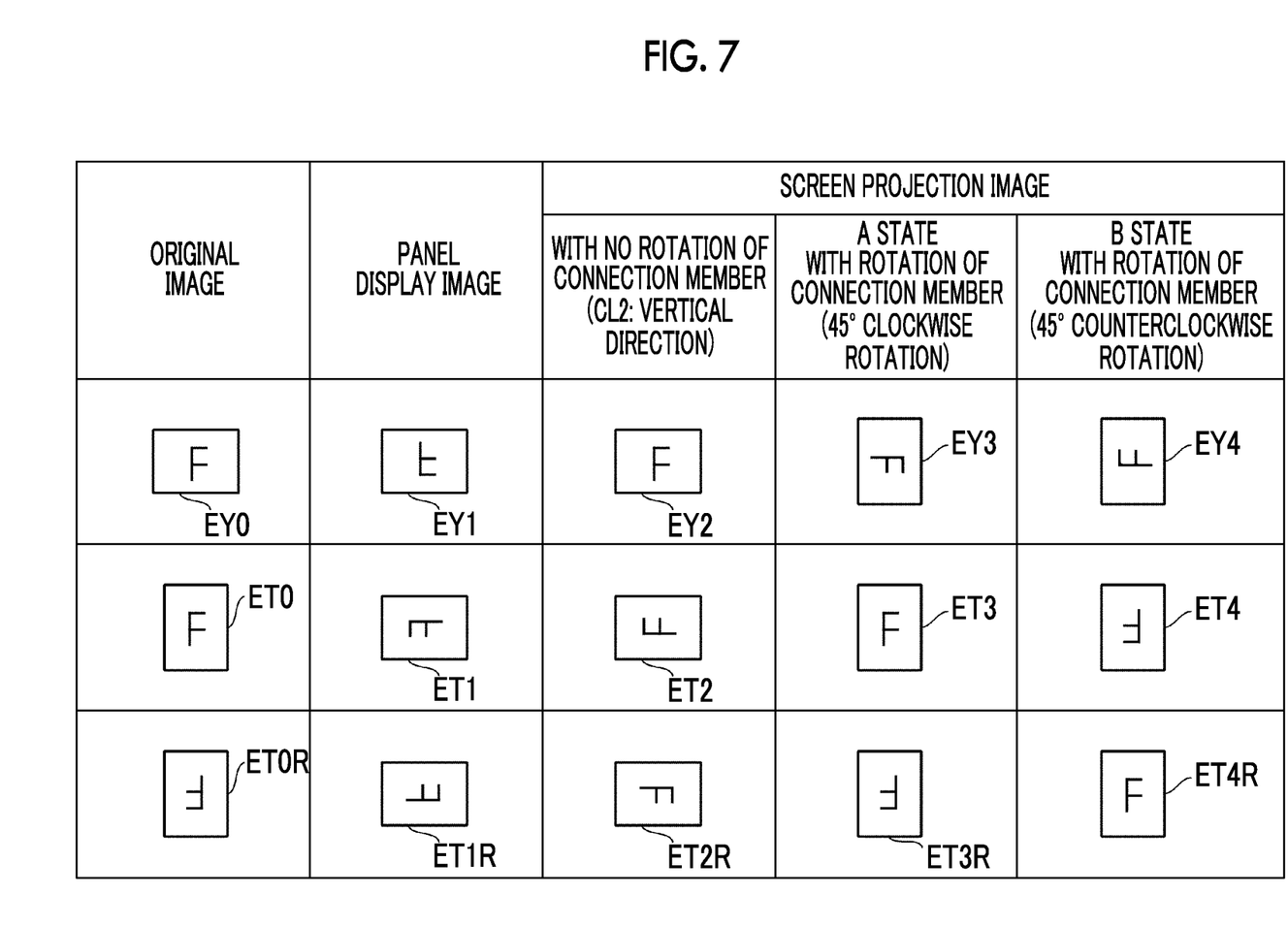
FIG. 7 is a table illustrating the relationship of an original image, a panel display image, and a screen projection image.

FIG. 7 is a table illustrating orientations of original images EY0, ET0, and ET0R, panel display images EY1, ET1, and ET1R that are displayed on the image forming panel 13, and screen projection images EY2 to EY4, ET2 to ET4, and ET2R to ET4R that are projected onto the screen 15. The original image EY0 indicates a horizontally long image, and the original image ET0 indicates a vertically long image. The original image ET0R indicates a vertically long image in which the orientation of the image is rotated at 180°. In the projection optical system 11 of the embodiment, the optical axes CL1 to CL3 are formed in a U shape using the first mirror 24 and the second mirror 25, an intermediate image is formed on the imaging plane 37 by the first optical system 21, and the intermediate image is projected onto the screen 15 by the second optical system 22 and the third optical system 23 on a magnified scale. For this reason, in order to display the screen projection image EY2 on the screen 15 in the same orientation as the landscape original image EY0, an image formed by rotating the original image EY0 as a mirror image at 180° is displayed on the image forming panel 13 as the panel display image EY1. With this, in a case of the center position where the second holding barrel 42 is positioned in the vertical direction, the screen projection image EY2 is projected on the screen 15 in the same orientation as the original image EY0.

Similarly, in a case of the portrait original image ET0, the panel display image ET1 is displayed on the image forming panel 13 in the same orientation as the landscape original image EY0. However, since the portrait image is displayed on the image forming panel 13 as the landscape image, the screen projection image ET2 is projected in a state in which the portrait image is oriented horizontally (a state in which the top and bottom of the image become left and right. For this reason, the orientation of the image is changed by 90°, and the projection image gives a sense of discomfort. In this case, the projection optical system 11 is switched to a state in which the second holding barrel 42 is rotated at 45° with respect to the first holding barrel 41, for example, an A state shown in FIG. 4. With the switching, it is possible to display the portrait image ET3 in which the orientation of the image is rotated at 90° and the top and bottom of the image are correctly oriented without changing the size of the projection image onto the screen 15. In a case of the vertically long original image ET0R in which the orientation of the image is rotated at 180°, the projection optical system 11 is switched to a state in which the second holding barrel 42 is rotated at 45° to the opposite side, for example, a B state shown in FIG. 4. With the switching, the screen projection image ET4R is formed, and the top and bottom are corrected in a correct orientation.

Next, the operation of the embodiment will be described. In a case where the normal landscape original image EY0 is projected, as shown in FIG. 3, the second holding barrel 42 is brought into a state of being set in the vertical direction. In this state, as shown in FIG. 7, the screen projection image EY2 is projected onto the screen 15 in the same orientation as the original image EY0. In a case where the portrait original image ET0 is mixed in the landscape original image EY0, the portrait image is displayed onto the screen 15 as the screen projection image ET2, which is the landscape image, in the same manner as the landscape image. For this reason, the top and bottom of the image are rotated at 90°, and the image gives a sense of discomfort. In this case, as shown in the A state of FIG. 4, the second holding barrel 42 is rotated at 45° around the first optical axis CL1 from the state of FIG. 3 to a portrait image projection position. In this state, the portrait image is projected onto the screen 15 as the vertically long image ET3. Furthermore, since projection is performed in a projection size with the same magnification as the landscape image, the portrait image ET3 can be observed without a sense of discomfort in the same manner as the landscape screen projection image EY2.

In a case of the original image ET0R in which the portrait image is rotated at 180°, the second holding barrel 42 is rotated at 90° from the A state of FIG. 4 to the opposite side around the first optical axis CL1. Accordingly, as shown in the B state of FIG. 5, the second holding barrel 42 is rotated at 45° with respect to the vertical line CL0. With this, the portrait image is projected onto the screen 15 with the top and bottom in the same orientation as the original image.

According to the embodiment, it is possible to project the portrait image as a vertically long image with the same projection magnification as the landscape image with the rotational movement of the second holding barrel 42 at 45° with respect to the first holding barrel 41 without correcting the orientation of the image using the image processing unit 70. Accordingly, in a case where the image displayed on the image forming panel 13 is projected while changing the orientation, the portrait image is not displayed on a reduced scale with respect to the landscape image, and it is possible to allow the landscape image and the portrait image to be observed without giving a sense of discomfort.

In the first embodiment, although the optical axes CL2 and CL3 are bent at 90° using the first mirror 24 and the second mirror 25, the first optical axis CL1 and the third optical axis CL3 may be parallel to each other, the orientations of luminous fluxes of the first optical axis CL1 and the third optical axis CL3 may be opposite to each other, and a bending angle may be other than 90°.

Second Embodiment

In the above-described first embodiment, in a case of the portrait image, the second holding barrel 42 is manually switched from a vertical position to the one end position (see FIG. 4) or the other end position (see FIG. 5) inclined at 45° with respect to the vertical line CL0 as shown in FIG. 3. Instead, a projector 85 of a second embodiment shown in FIGS. 8 and 9 has a rotational movement unit 87. The rotational movement unit 87 has a motor 90, a first sensor 91, a second sensor 92, a third sensor 93, a rotational movement determination unit 94, a motor drive unit 95, and an image orientation change button 96. In the following embodiment, the same constituent members as those in the first embodiment are represented by the same reference numerals, and overlapping description will not be repeated.

Figure 8:
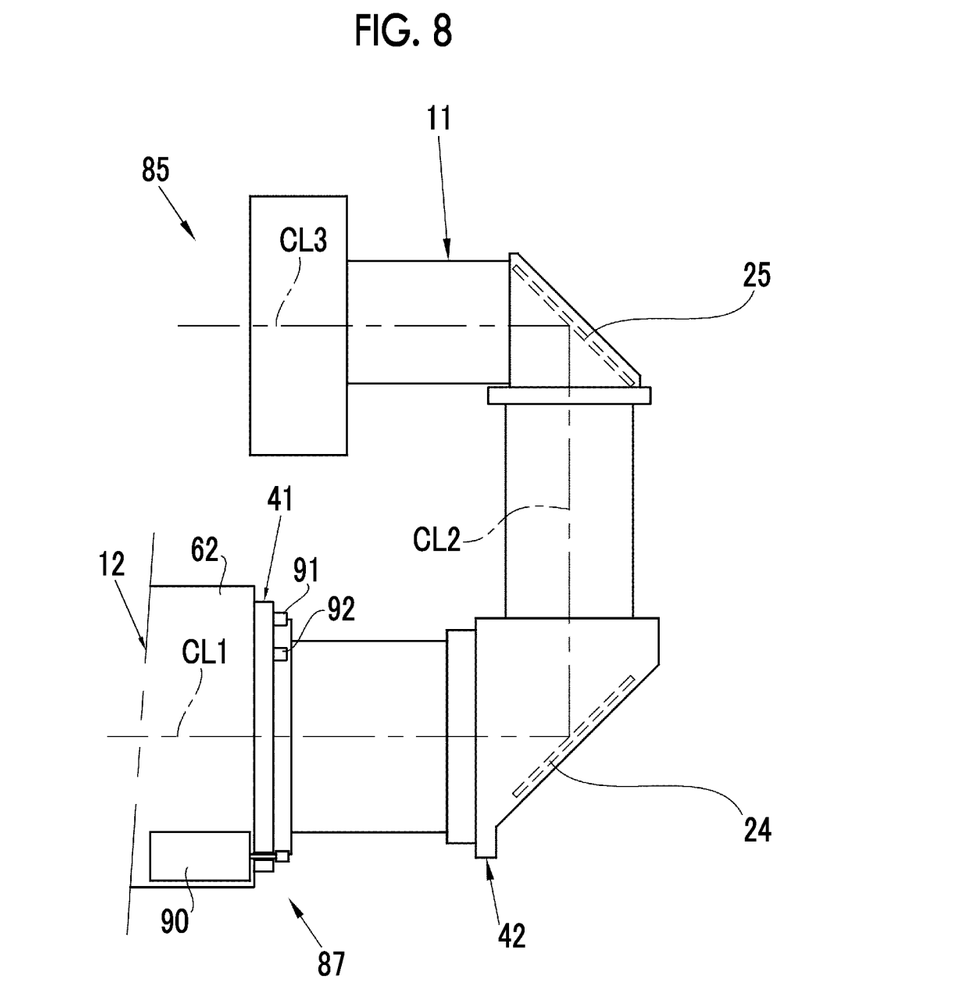
FIG. 8 is a side view of a second embodiment in which a motor-driven rotational movement unit is provided.

The rotational movement unit 87 rotationally moves the second holding barrel 42 clockwise and counterclockwise at 45° with respect to the first holding barrel 41 through gear drive of the motor 90. The first sensor 91 to the third sensor 93 detect a rotational movement position of the second holding barrel 42 with respect to the first holding barrel 41. The first sensor 91 detects an intermediate position in the circumferential direction of the rotational movement range, the second sensor 92 detects the one end position in the circumferential direction of the rotational movement range, and the third sensor 93 detects the other end position in the circumferential direction of the rotational movement range.

The rotational movement determination unit 94 determines whether an original image to be projected is a portrait image or a landscape image based on image orientation information that is one of imaging information of each original image from the image memory 72. Then, in a case of the landscape image, the second holding barrel 42 is set at the intermediate position in the circumferential direction of the rotational movement range. With this, as shown by the solid line of FIGS. 3 and 5, the second holding barrel 42 is at a landscape image projection position where the second holding barrel 42 is oriented in the vertical direction. In a case of the portrait image, the second holding barrel 42 is set at either of the one end position or the other end position based on the orientation of the image. With this, as shown by the two-dot-chain line of FIGS. 4 and 5, the second holding barrel 42 is at a portrait image projection position where the second holding barrel 42 is inclined at 45° with respect to the vertical line CL0.

Figure 9:
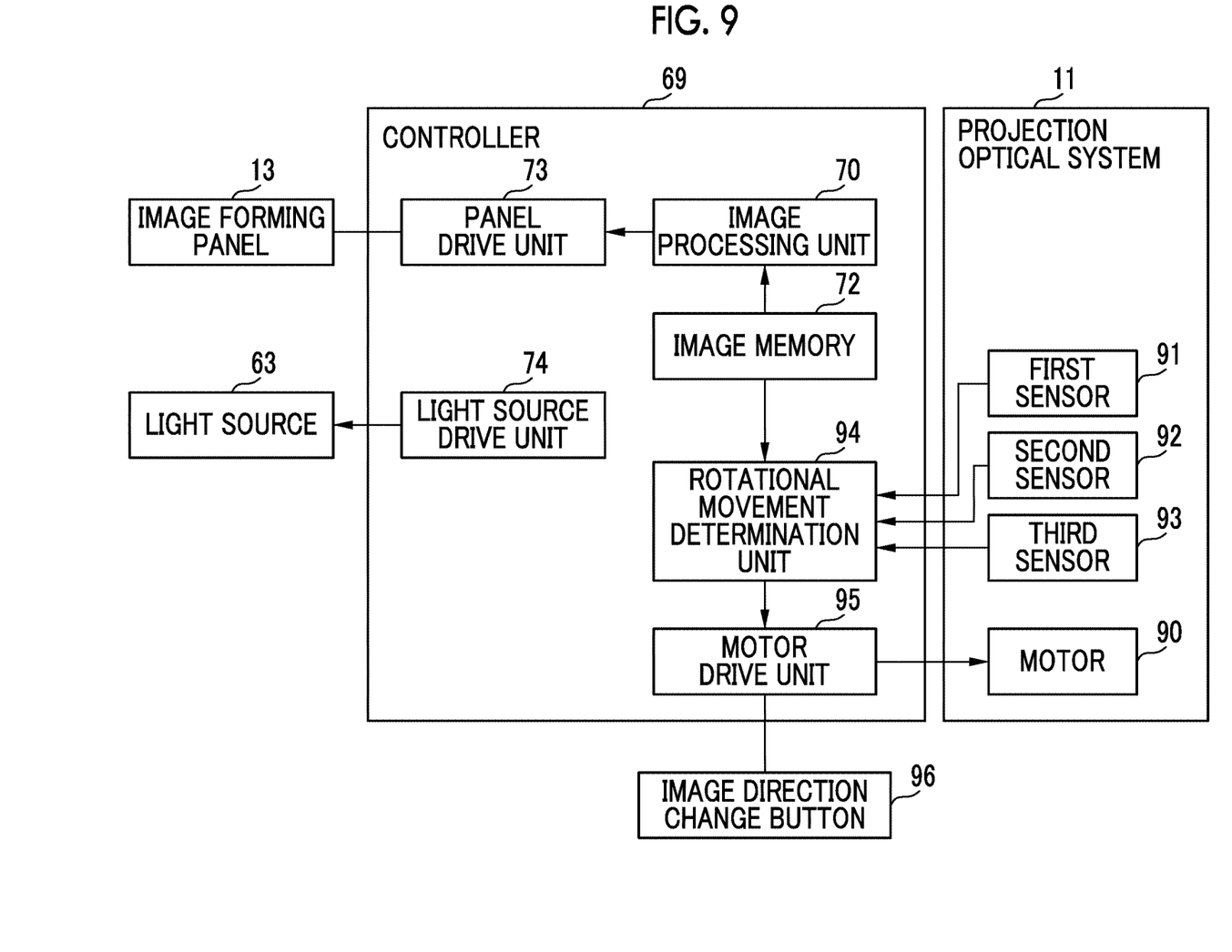
FIG. 9 is a control block diagram in the second embodiment.

The image orientation change button 96 is operated in a case where the portrait image is projected onto the screen 15 with the top and bottom reversed in a state in which the second holding barrel 42 is set at the one end position or the other end position. The image orientation change button 96 rotates the motor 90 through the motor drive unit 95, and when the second holding barrel 42 is positioned at the one end position, rotationally moves the second holding barrel 42 to the other end position on the opposite side. When the second holding barrel 42 is positioned at the other end position, the image orientation change button 96 rotationally moves the second holding barrel 42 to the one end position on the opposite side. With this, in a case where the portrait image is projected with the top and bottom reversed, the portrait image is projected in a state in which the top and bottom of the portrait image are returned correctly.

Third Embodiment

Figure 10:
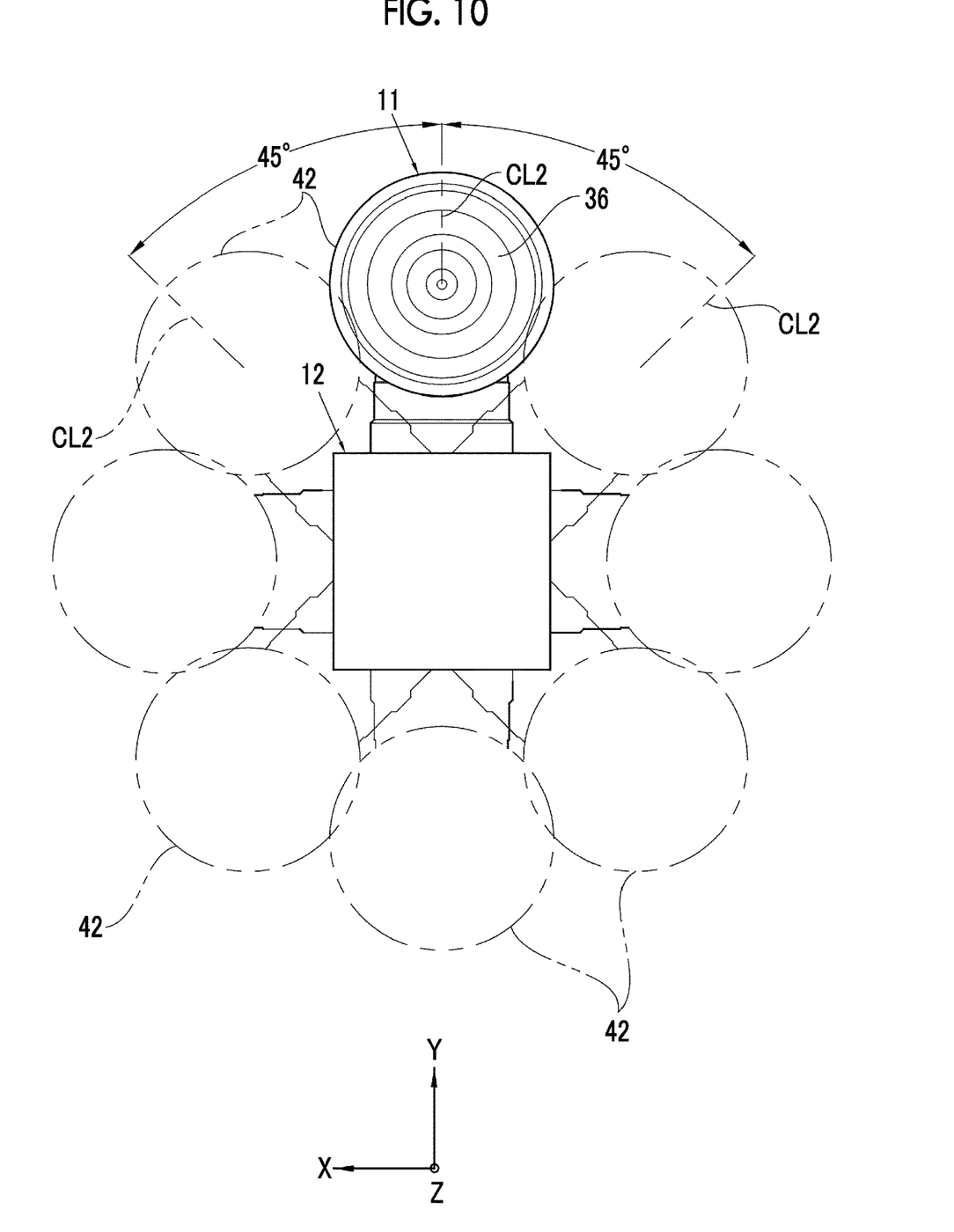
FIG. 10 is a front view of a third embodiment in which a second holding barrel is rotationally moved in increments of 45°.

In the first embodiment and the second embodiment, although the rotational movement range of the second holding barrel 42 is restricted to 90°, in a third embodiment shown in FIG. 10, the second holding barrel 42 can be rotationally moved in increments of 45° in a rotational movement range of 180° clockwise and counterclockwise with respect to the first holding barrel 41. In this case, a known click mechanism is provided at rotational movement stop positions in increments of 45°, and can set the second holding barrel 42 at each position. The rotational movement of the second holding barrel 42 may be manually performed as in the first embodiment or may be automatically performed by motor drive as in the second embodiment.

Fourth Embodiment

Figure 11:
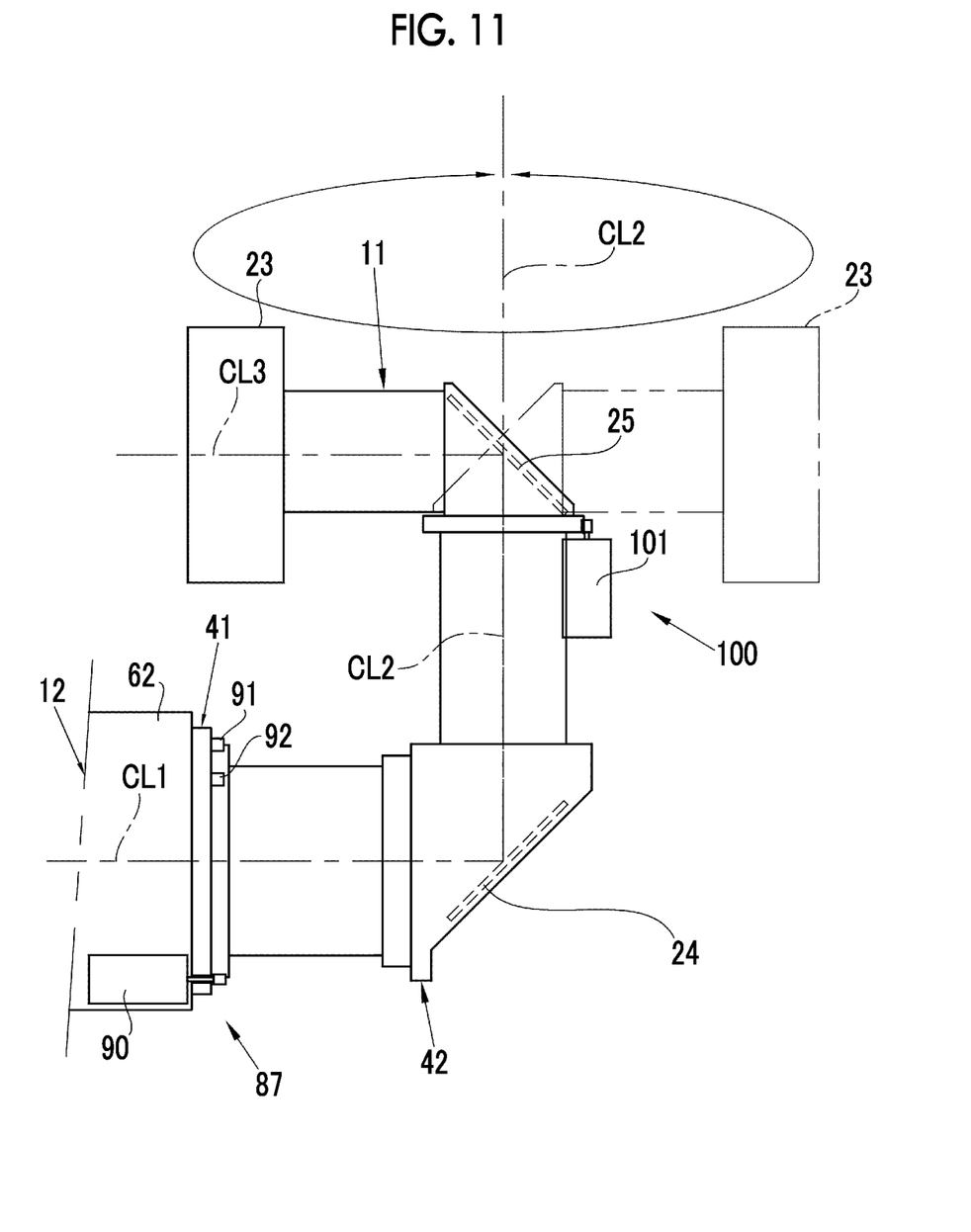
FIG. 11 is a side view of a fourth embodiment in which a third optical system and a second mirror are rotationally moved in increments of 90° with respect to a second optical system.

In the first embodiment, as shown in FIG. 2, the connection barrel 43b is externally fitted to the connection barrel 44a such that both barrels 43b and 44a are fixed rotationally unmovably. In contrast, in a fourth embodiment, the connection barrel 43b is rotationally movably connected to the connection barrel 44a shown in FIG. 2, thereby forming a second connection member 100 as shown in FIG. 11. Then, the rotational movement of the third optical system 23 and the second mirror 25 are regulated in increments of 90° around the second optical axis CL2 by a click mechanism. In the fourth embodiment, the second connection member 100 is provided, whereby projection is performed on a side surface or a rear surface in addition to a front surface, and it is possible to increase projection directions. The rotational movement of the third optical system 23 and the second mirror 25 in the second connection member 100 around the second optical axis CL2 may be manually performed or may be performed by drive of a motor 101.

In the respective embodiments, although a transmissive liquid crystal panel is used as the image forming panel 13, a reflective liquid crystal panel may be used. In this case, the light source 63 is disposed on the front surface side of the image forming panel 13 to perform simultaneous irradiation of illumination light of three colors of RGB. In a case where a DMD is used as the image forming panel 13, for example, the light source 63 is disposed on the front surface side of the image forming panel 13 to emit LED of three colors of RGB in a time-division manner in synchronization with a forming timing of a three-color image of the DMD.

In the respective embodiments, although description has been provided based on an example where the projector 10 is provided on a table, the invention can also be applied to a case where the projector is used while being suspended from a ceiling or the like. Furthermore, although an example where an image is projected onto the screen 15 has been described, a projection plane is not limited to the screen 15, and the projectors 10 and 85 can be used as a projector that projects an image on various projection planes.

In the respective embodiments, terms, such as perpendicular and parallel, have been used to represent a positional relationship between the plurality of optical axes or specific numerical values of an angle, such as 90°, have been used for description. However, the terms or the numerical values include a range to be allowed with an error based on accuracy required for the optical system.

In the respective embodiments, although the projectors 10 and 85 in which the projection optical system 11 is fixed to the housing 62 have been described, the projection optical system 11 may be attachably and detachably mounted in the projector body 12. In a case where an interchangeable projection optical system 11 is used, for example, a part of lenses of the first optical system 21, for example, the first lens 31 and the second lens 32 may be provided in the projector body 12, and the number of lenses on the projection optical system 11 side may be decreased.

EXPLANATION OF REFERENCE

10: projector
11: projection optical system
12: projector body
13: image forming panel
13a: image display surface
15: screen
21: first optical system
22: second optical system
23: third optical system
24: first mirror
25: second mirror
26: lens barrel
31: first lens
32: second lens
33: third lens
34: fourth lens
35: fifth lens
36: sixth lens
37: imaging plane
40: connection member
41: first holding barrel
41a: first lens frame
41b: flange
41c: second lens frame
42: second holding barrel
43a, 43b: connection barrel
43c: first mirror frame
44a: connection barrel
44b: second mirror frame
45a: third lens frame
45b: fourth lens frame
50, 51: inclined surface
53: opening
57: circumferential groove
58: rotational movement regulation pin
62: housing
62a: lens mounting hole
63: light source
69: controller
70: image processing unit
72: image memory
73: panel drive unit
74: light source drive unit
85: projector
87: rotational movement unit
90: motor
91: first sensor
92: second sensor
93: third sensor
94: rotational movement determination unit
95: motor drive unit
96: image orientation change button
100: second connection member
101: motor
CL0: vertical line
CL1: first optical axis
CL2: second optical axis
CL3: third optical axis
ET0: original image
ET1: panel display image
ET2: screen projection image
EY0: original image
EY1: panel display image
EY2: screen projection image

What is claimed is:
1. A projection optical system comprising:
a first optical system having a first optical axis;
a first reflection member that bends the first optical axis to form a second optical axis;

a second reflection member that bends the second optical axis in the same direction as the first optical axis to form a third optical axis;

a third optical system having the third optical axis;

a first connection member that holds the first reflection member, the second reflection member, and the third optical system, and connects the first reflection member, the second reflection member, and the third optical system to the first optical system to be rotationally movable in a rotational movement range with increments of 45° around the first optical axis.

2. The projection optical system according to claim 1, wherein each of the first reflection member and the second reflection member is a member that bends the optical axis at 90°.

3. The projection optical system according to claim 1, wherein a reflection surface of each of the first reflection member and the second reflection member is a plane.

4. The projection optical system according to claim 1, further comprising:

a second optical system having the second optical axis between the first reflection member and the second reflection member.

5. The projection optical system according to claim 4, further comprising:

a second connection member that connects the third optical system and the second reflection member to the second optical system to be rotationally movable in increments of 90° around the second optical axis.

6. A projector comprising:

the projection optical system according to claim 1; and an image forming panel that displays an image toward the first optical system of the projection optical system based on an original image.

7. The projector according to claim 6, further comprising:

a rotational movement unit that switches a rotational movement position of the first connection member based on image orientation information of the original image.

8. The projector according to claim 7, wherein the rotational movement unit sets the second optical axis to a vertical direction in a case where the original image is a horizontally long landscape image based on the image orientation information of the original image, and inclines and sets the second optical axis at 45° with respect to the vertical direction in a case where the original image is a vertically long portrait image.

9. The projector according to claim 7, wherein the rotational movement unit has a motor that rotates the second optical axis at 45° around the first optical axis with respect to the first optical system.

10. The projection optical system according to claim 2, wherein a reflection surface of each of the first reflection member and the second reflection member is a plane.

11. The projection optical system according to claim 2, further comprising:

a second optical system having the second optical axis between the first reflection member and the second reflection member.

12. The projection optical system according to claim 3, further comprising:

a second optical system having the second optical axis between the first reflection member and the second reflection member.

13. A projector comprising:

the projection optical system according to claim 2; and an image forming panel that displays an image toward the first optical system of the projection optical system based on an original image.

14. A projector comprising:

the projection optical system according to claim 3; and an image forming panel that displays an image toward the first optical system of the projection optical system based on an original image.

15. A projector comprising:

the projection optical system according to claim 4; and an image forming panel that displays an image toward the first optical system of the projection optical system based on an original image.

16. A projector comprising:

the projection optical system according to claim 5; and an image forming panel that displays an image toward the first optical system of the projection optical system based on an original image.

17. The projector according to claim 8, wherein the rotational movement unit has a motor that rotates the second optical axis at 45° around the first optical axis with respect to the first optical system.

* * * * *